(12) United States Patent
Terpsma et al.

(10) Patent No.: US 8,608,187 B2
(45) Date of Patent: Dec. 17, 2013

(54) FLANGE MOUNT DRAWBAR WITH SELF-ALIGNING SNUBBER

(71) Applicant: SAF-HOLLAND, Inc., Holland, MI (US)

(72) Inventors: Eric Terpsma, Holland, MI (US); Jared Patterson, Hudsonville, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 13/690,660

(22) Filed: Nov. 30, 2012

(65) Prior Publication Data

US 2013/0140793 A1     Jun. 6, 2013

Related U.S. Application Data (60) Provisional application No. 61/567,168, filed on Dec. 6, 2011.

(51) Int. Cl.
*B60D 1/00* (2006.01)

(52) U.S. Cl.
USPC .......................................... 280/504; 280/495

(58) Field of Classification Search
USPC ........................... 280/504, 500, 477, 495, 511
See application file for complete search history.

(56) References Cited

U.S. PATENT DOCUMENTS

| | | | | |
|---|---|---|---|---|
| 3,955,249 A * | 5/1976 | Shiozaki | ......................... | 24/503 |
| 6,938,912 B1 * | 9/2005 | Norton et al. | ................. | 280/507 |
| 7,192,047 B2 * | 3/2007 | Sauermann | ................... | 280/509 |
| 7,441,793 B1 * | 10/2008 | Lim | .............................. | 280/504 |
| 8,276,930 B1 * | 10/2012 | Hesse et al. | ................. | 280/504 |
| 8,356,831 B2 * | 1/2013 | Pollock et al. | ............. | 280/479.3 |
| 2005/0104325 A1 * | 5/2005 | Rodgers | ........................ | 280/504 |

* cited by examiner

*Primary Examiner* — Tashiana Adams
(74) *Attorney, Agent, or Firm* — Price Heneveld LLP (57) ABSTRACT

A drawbar assembly includes a mounting member adapted to couple to a vehicle and that includes a body portion having a first passage, an eye portion extending outwardly from the mounting body portion, wherein the eye portion includes a top surface, a bottom surface and a second passage extending therethrough adapted to receive a pintle hook therein, and a wedge member slidably received within the first passage of the body portion. The wedge member is slidably movable between a first portion, wherein the wedge member is withdrawn into the first passage of the body portion, and a second position, where the wedge member extends into the second passage of the eye portion. The wedge member is located between the top surface and the bottom surface of the eye portion, and does not extend above the top surface or the bottom surface.

24 Claims, 8 Drawing Sheets

FLANGE MOUNT DRAWBAR WITH SELF-ALIGNING SNUBBER

BACKGROUND OF THE INVENTION

The present invention relates to a drawbar assembly for use in conjunction with pintle hook assemblies for coupling and uncoupling of towing and towed vehicles, and in particular to a drawbar assembly that includes a self-aligning snubber or wedge member.

SUMMARY OF THE INVENTION

One aspect of the present invention is to provide a drawbar assembly that comprises a mounting member adapted to couple to a vehicle and including a body portion having a first passage, an eye portion extending outwardly from the mounting body portion, the eye portion including a top surface, a bottom surface and a second passage extending therethrough adapted to receive the pintle hook therein, and a wedge member slidably received within the first passage of the body portion and slidably movable between a first position, wherein the wedge member is withdrawn into the first passage of the body portion, and a second position, wherein the wedge member extends into the second passage of the eye portion, and wherein the wedge member is located between the top surface and the bottom surface of the eye portion, and does not extend above the top surface of the eye portion and does not extend below the bottom surface of the eye portion.

Another aspect of the present invention is to provide a drawbar assembly that comprises a mounting member adapted to couple to a vehicle and including a body portion having a first passage, an eye portion extending outwardly from the mounting body portion, the eye portion including a second passage extending therethrough adapted to receive a pintle hook therein, and a wedge member slidably received within the first passage of the body portion and slidably movable between a first position, wherein a majority of the wedge member is withdrawn into the first passage of the body portion, and a second position, wherein the wedge member extends further into the second passage of the eye portion than when the wedge member is in the first position.

Yet another aspect of the present invention is to provide a drawbar assembly that comprises a mounting member adapted to couple to a vehicle and including a body portion having a first passage having a first cross-sectional shape, an eye portion extending outwardly from the mounting portion, the eye portion including a second passage extending therethrough adapted to received a pintle hook therein, and a wedge member slidably received within the first passage of the body portion and slidably movable between a first position, wherein the wedge member is withdrawn into the first passage of the body portion, and a second position, wherein the wedge member extends further into the second passage of the eye portion than when the wedge member is in the first position, and wherein the wedge member has a second cross-sectional shape that is complementary to the first cross-sectional shape of the first passage of the body portion, thereby preventing rotation of the wedge member with respect to the body portion of the mounting member.

The present inventive drawbar assembly provides a durable, uncomplicated design that may be operated by even unskilled personnel to more securely couple the drawbar assembly with an associated pintle hook assembly. The drawbar assembly is efficient in use, economical to manufacture, capable of a long operating life, inherently prevents damage to the snubber or wedge member, provides a relative increase in area within which to receive the associated pintle hook into the drawbar assembly, thereby allowing use of the drawbar assembly with various size pintle hooks, and is particularly well adapted for the proposed use.

These and other advantages of the invention will be further understood and appreciated by those skilled in the art by reference to the following written specification, claims and appended drawings.

DETAILED DESCRIPTION OF PREFERRED EMBODIMENT

Figure 1:
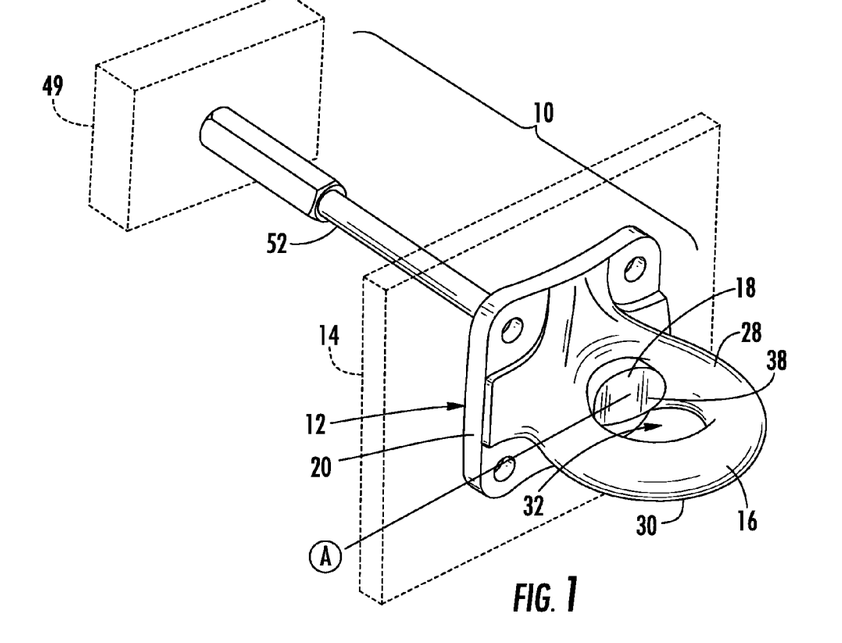
FIG. 1 is a perspective view of the drawbar assembly embodying the present invention, with a snubber or wedge member shown in a withdrawn position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIG. 1) generally designates a drawbar assembly embodying the present invention. In the illustrated example, the drawbar assembly 10 includes a mounting member 12 coupled to a frame member 14 of a vehicle, an eye portion 16, and a snubber or wedge member 18 slidably engaging the mounting member 12.

The mounting member includes a body portion 20 (FIG. 2) having outwardly extending mounting flanges 22 each including a mounting aperture 24 extending therethrough and adapted to receive mounting hardware, such as bolts, therein for coupling the drawbar assembly 10 with the frame member 14. The body portion 20 further includes a passage 26 (FIG. 7)

extending therethrough. In the illustrated example, the passage 26 is provided an oval-shaped cross-sectional configuration.

Figure 4:
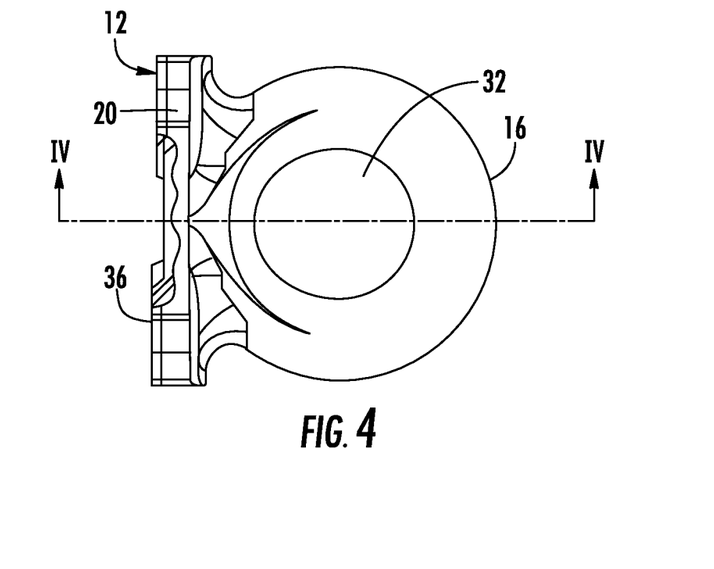
FIG. 4 is a top plan view of the mounting member and the ring portion.

The eye portion 16 is integrally formed with and extends outwardly from the body portion 20 and is horizontally disposed therefrom. The eye portion 16 includes a top surface 28, a bottom surface 30, and defines a passage 32 extending therethrough and adapted to receive a pintle hook assembly (not shown) therein. It is noted that while the eye portion 16 is illustrated as a ring (FIG. 4), thereby defining a circular passage 32, other suitable geometrical configurations may be utilized.

Figure 2:
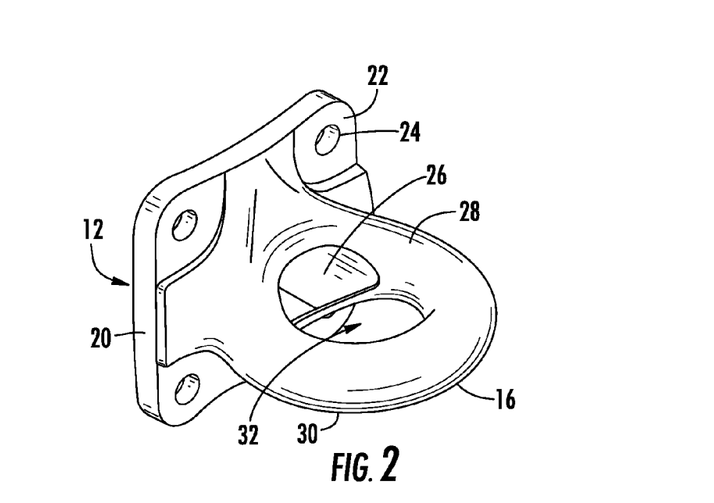
FIG. 2 is a perspective view of a mounting member and eye portion of the drawbar assembly.
Figure 5:
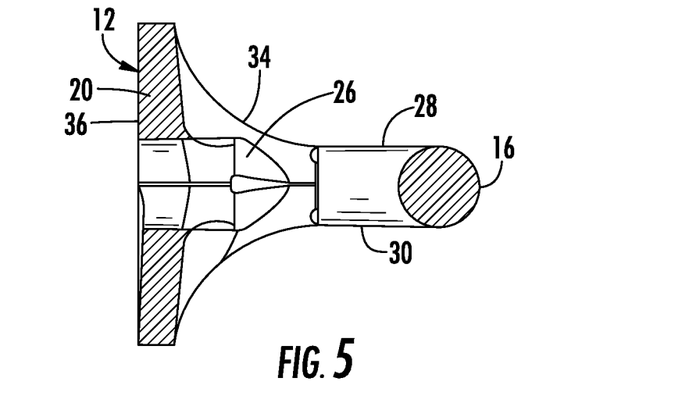
FIG. 5 is a cross-sectional side elevational view of the mounting member and the eye portion taken along the line V-V, FIG. 4.
Figure 6:
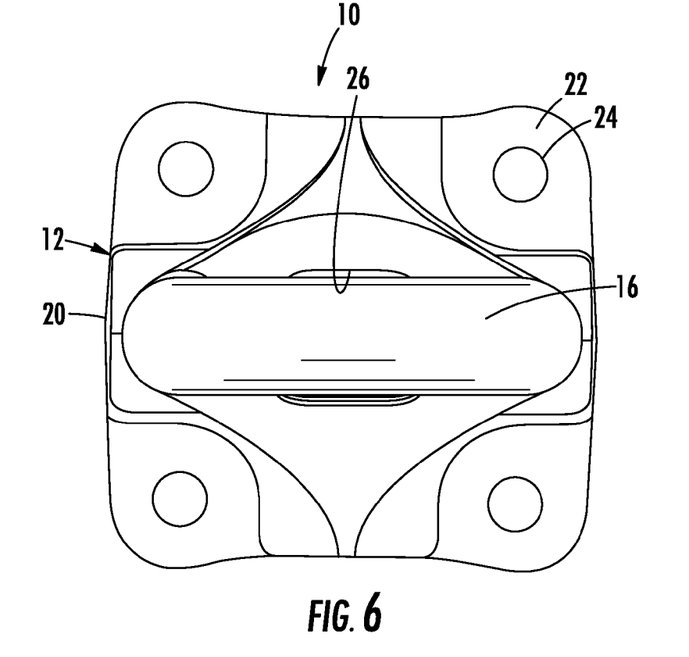
FIG. 6 is a rear elevational view of the drawbar assembly.
Figure 7:
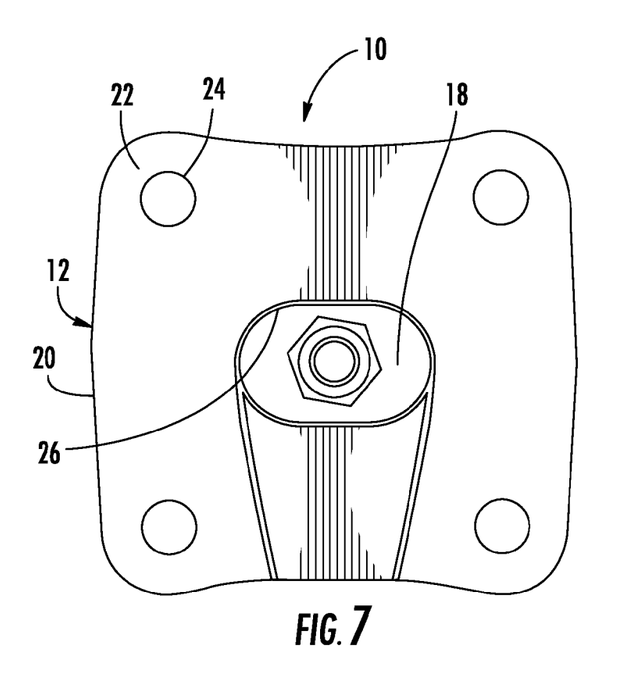
FIG. 7 is a front elevational view of the drawbar assembly.
Figure 8:
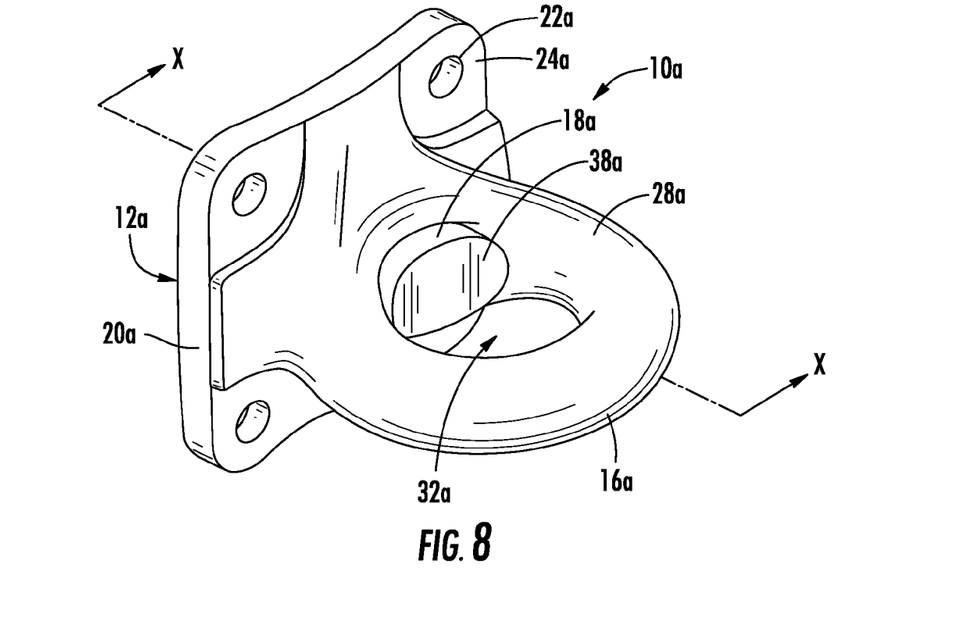
FIG. 8 is a perspective view of an alternative embodiment of the drawbar assembly.
Figure 9:
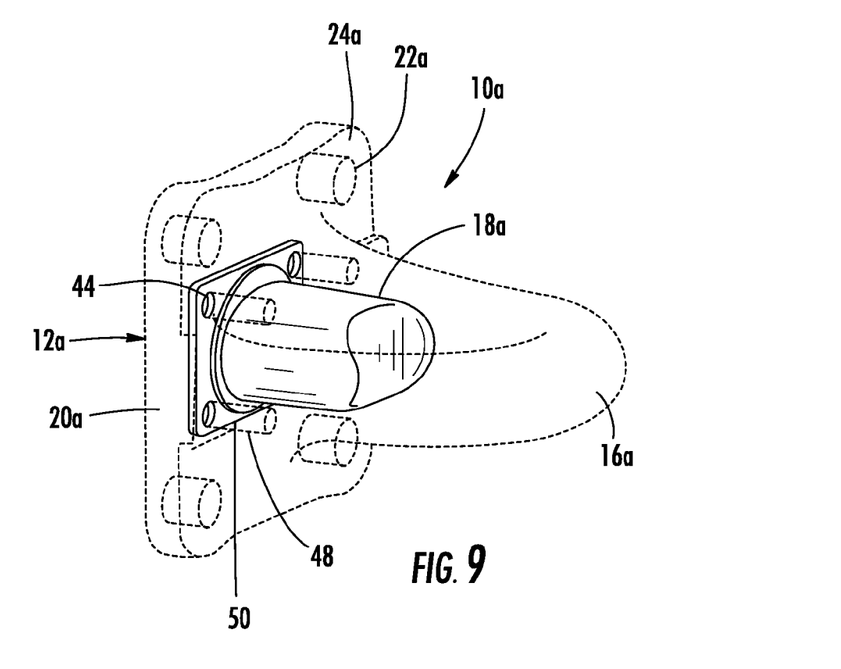
FIG. 9 is a perspective view of the second embodiment of the drawbar assembly.
Figure 10:
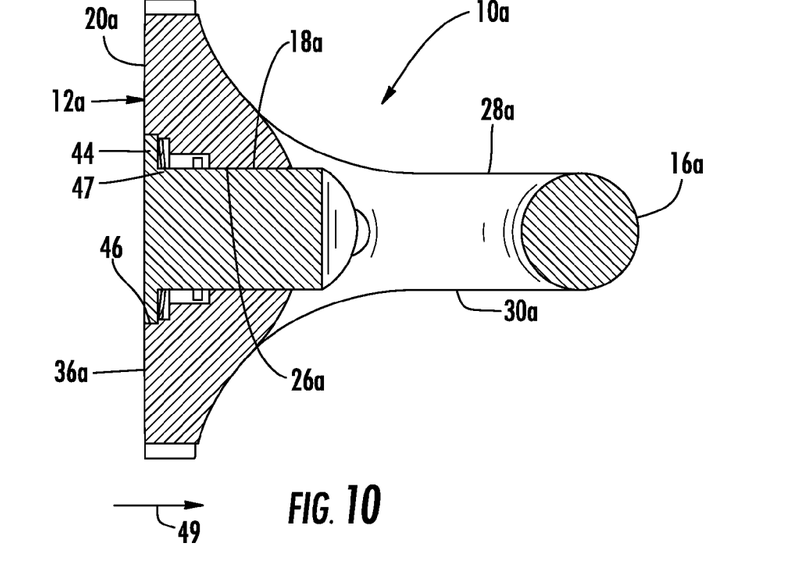
FIG. 10 is a cross-sectional side elevational view of the drawbar assembly taken along the line X-X, FIG. 8.
Figure 11:
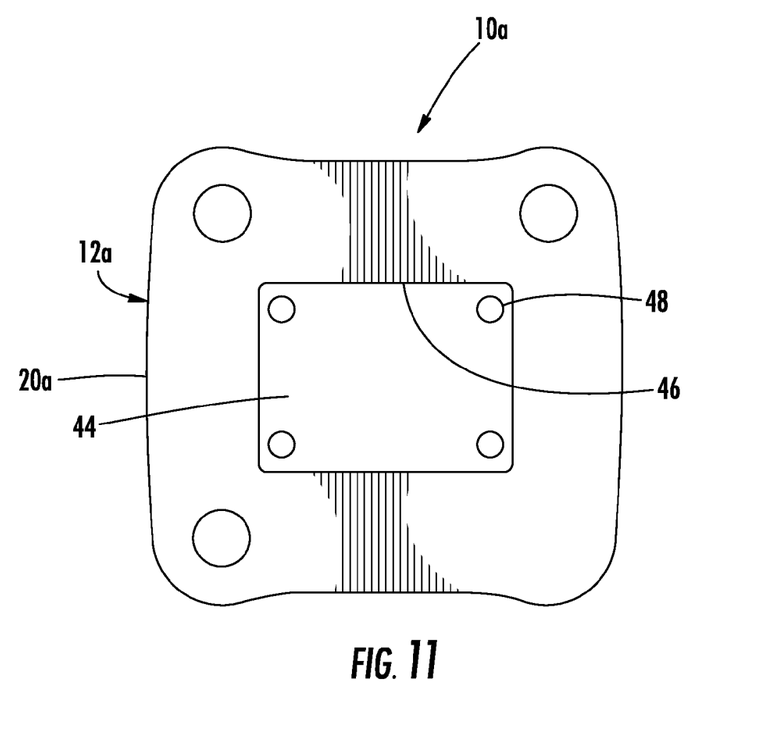
FIG. 11 is a front elevational view of the alternative embodiment of the drawbar assembly.

As best illustrated in FIGS. 2, 5 and 7, the passage 26 of the body portion 20 further extends through the proximate end 34 of the eye portion 16, thereby providing access from the front surface 36 of the body portion 20 to the passage 32 as defined by the eye portion 16.

Figure 3:
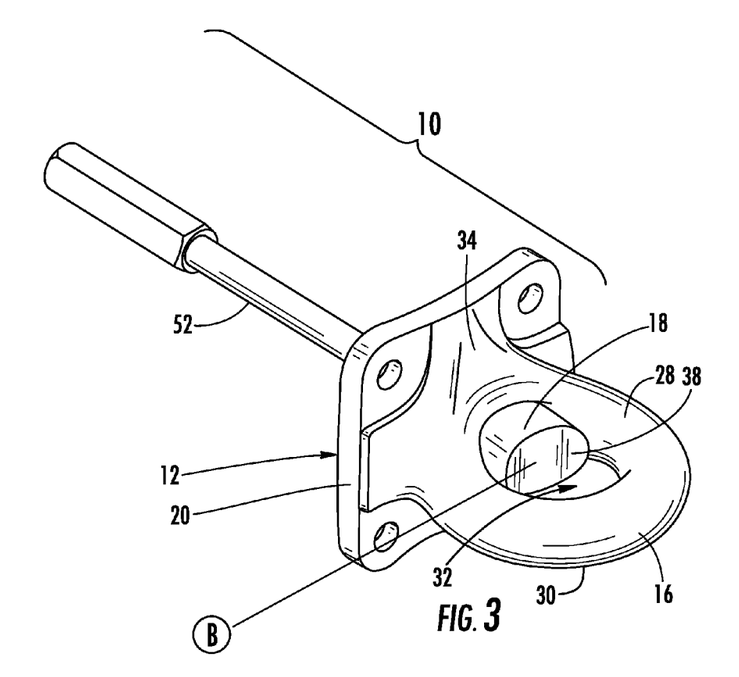
FIG. 3 is a perspective view of the drawbar assembly, with the wedge in an extended position.

The wedge member 18 is slidably received within the passage 26 of the body portion 20 and the eye portion 16 and is slidably movable between a first or retracted position A, wherein the wedge member 18 is withdrawn into the passage 26, and a second or extended position B, wherein the wedge member 18 extends further into the passage 32 than when the wedge member 18 is in the first position A. In the illustrated example, the wedge member 18 is moved between the retracted position A and the extended position B via a pneumatic actuator 49 coupled to the wedge member 18 via a linkage assembly 52. Of course, alternate actuator mechanisms may be utilized, including hydraulic and manually actuated mechanisms. It is noted that all or a majority of the wedge member 18 is located within the passage 26 when the wedge member 18 is in the fully retracted position A. The wedge member 18 is selectively extendable into the passage 32 to abut the associated pintle hook, thereby reducing slop of the pintle hook within the drawbar assembly 10, increasing the towability of the towed vehicle, and controllability of the towing vehicle. The wedge member 18 includes a rearwardly facing concave abutment surface 38 that abuts the associated pintle hook. As best illustrated in FIGS. 1, 3 and 7, the wedge member 18 is provided with an oval-shaped cross-sectional configuration that is complementary to the oval-shaped cross-sectional configuration of the passage 26, thereby preventing rotation of the wedge member 18 with respect to the mounting member 12. It is noted that while the wedge member 18 and passage 26 are provided oval-shaped cross-sectional configurations, other geometrical configurations prevent rotation of the wedge member 18 within the passage 26 may also be utilized.

The reference numeral 10a (FIG. 8) generally designates another embodiment of the drawbar assembly. Since the drawbar assembly 10a is similar to the previously described drawbar assembly 10, similar parts appearing in FIGS. 1-7 and FIGS. 8-11 are represented by the same, corresponding reference numerals, except for the suffix "a" in the numerals of the latter. The drawbar assembly 10a is similar to the previously described drawbar assembly 10, with the most notable exception being the replacement of the slidably adjustable wedge member 18 with a stationary wedge member 18a. For those applications where an actuator is not available or is unnecessary, the slidably adjustable wedge member 18 is replaced with the stationary or static wedge member 18a. The wedge member 18a is similar in cross-sectional configuration to the wedge member 18, such that the wedge member 18a may be slidably positioned within the passage 26a. The wedge member 18a is held in position by a rectangularly-shaped mounting plate 44 which is received within a corresponding recess 46 located within the front surface 36a of the body portion 20a, and a compression spring washer 47 positioned between the mounting plate 44 and the wedge member 18a and biasing the wedge member 18a in a direction 49. Alignment bosses 48 extend into corresponding alignment apertures 50 located within the body portion 20a of the mounting member 12a to either permanently or temporarily secure the wedge member 18a to the mounting member 12a. The length of the wedge member 18a may be selected so as to size the effective area of the passage 32a for variously sized pintle hook assemblies.

The reference numeral 10b (FIG. 12) generally designates another embodiment of the drawbar assembly. Since the drawbar assembly 10b is similar to the previously described drawbar assembly 10 and drawbar assembly 10a, similar parts appearing in FIGS. 1-11 and FIG. 12 are represented by the same, corresponding reference numerals, except for the suffix "b" in the numerals of the latter. In the illustrated example, the drawbar assembly 10b is similar to the drawbar assembly 10, with the most notable exception being the additional of a stop arrangement 60. The stop arrangement 60 includes a pair of keyway members 62 formed along opposite sides of the wedge member 18b that slidably engage corresponding slots 64 formed within the passage 26b of the mounting member 12b. It is noted that the slots 64 extend only a portion of the distance along the length of the passage 26b and do not communicate with the passage 32b, thereby limiting the extent to which the wedge member 18b may advance towards the passage 32b.

Figure 12:
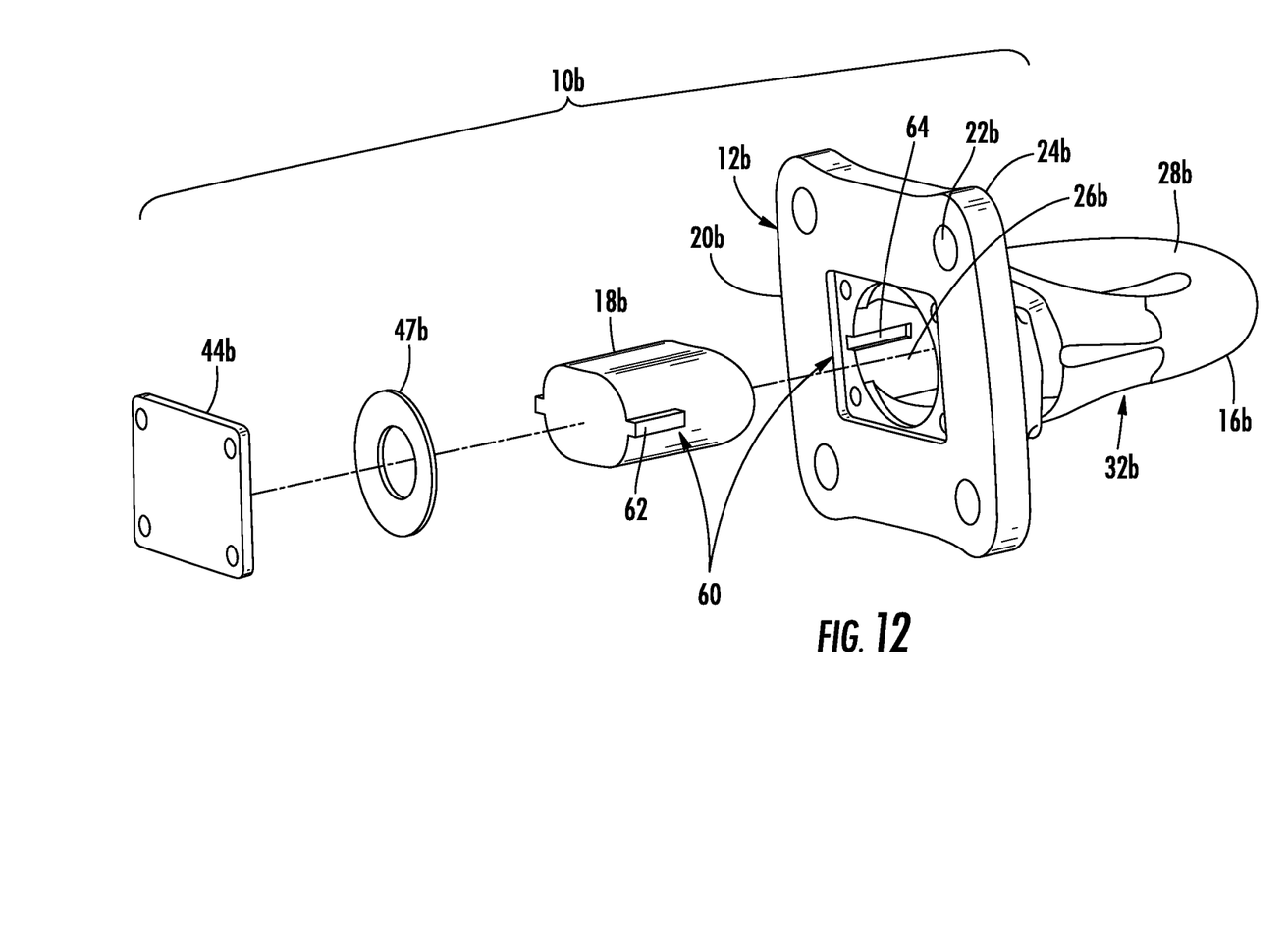
FIG. 12 is an exploded perspective view of another alternative embodiment of the drawbar assembly.
Figure 13:
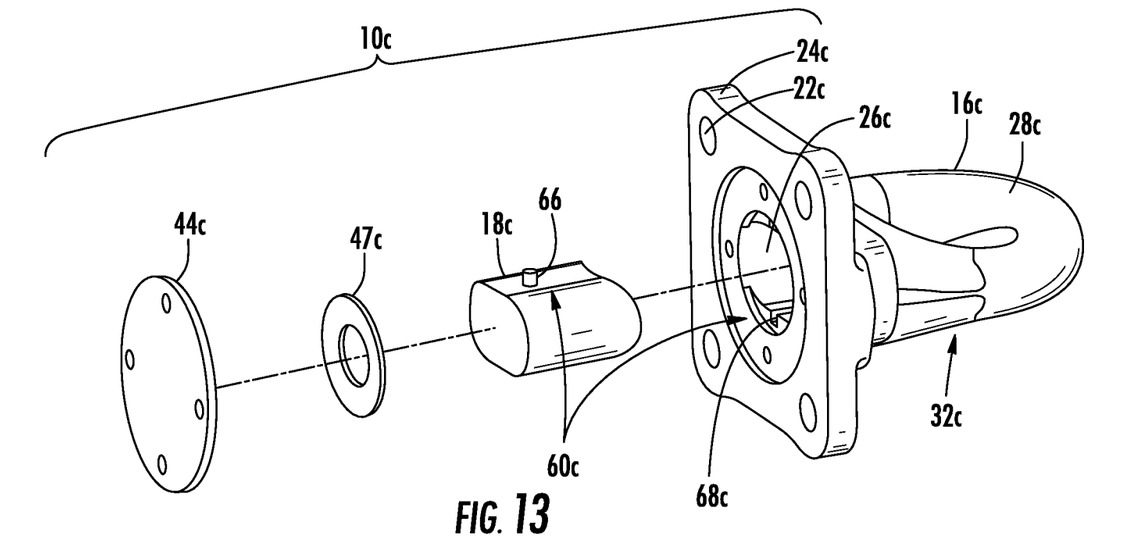
FIG. 13 is an exploded perspective view of another alternative embodiment of the drawbar assembly.

The reference numeral 10c (FIG. 13) generally designates another embodiment of the drawbar assembly. Since the drawbar assembly 10c is similar to the previously described drawbar assembly 10b, similar parts appearing in FIG. 12 and FIG. 13 are represented by the same, corresponding reference numerals, except for the suffix "c" in the numerals of the latter. In the illustrated example, the drawbar assembly 10c is similar to the drawbar assembly 10b, with the most notable exception being the replacement of the stop arrangement 60 with a stop arrangement 60c. Specifically, the stop arrangement 60c includes a pair of stop pins 66 extending outwardly from the wedge member 18c which slidably engage corresponding recesses 68 formed within the passage 26c of the mounting member 12c. The pins 66 and the recesses 68 cooperate to limit the extent to which the wedge member 18c may advance towards the passage 32c.

In the foregoing description, it would be readily appreciated by those skilled in the art that modifications may be made to the invention without departing from the concepts disclosed herein. Such modifications are to be considered as included in the following claims, unless these claims by their language expressly state otherwise.

The invention claimed is:
1. A drawbar assembly, comprising:
a mounting member adapted to couple to a vehicle and including a body portion having first passage;
an eye portion extending outwardly from the body portion, the eye portion including a top surface, a bottom surface and a second passage extending therethrough adapted to receive a pintle hook therein; and
a wedge member slidably received within the first passage of the body portion and slidably movable between a first position, wherein the wedge member is withdrawn into the first passage of the body portion, and a second position, wherein the wedge member extends into the second passage of the eye portion, and wherein the wedge member is located between the top surface and the bottom surface of the eye portion, does not extend above the top surface of the eye portion, and does not extend below the bottom surface of the eye portion.

2. The drawbar assembly of claim 1, wherein first passage of the body portion has a first cross-sectional shape, and wherein the wedge member has a second cross-sectional shape that is complimentary to the first cross-sectional shape of the first passage of the body portion thereby preventing rotation of the wedge member with respect to the body portion of the mounting member.

3. The drawbar assembly of claim 2, wherein first cross-sectional shape is oval-shaped.

4. The drawbar assembly of claim 1, wherein the wedge member is pneumatically driven between the first and second positions.

5. The drawbar assembly of claim 1, wherein the eye portion is integral with the body portion of the mounting member.

6. The drawbar assembly of claim 1, wherein the wedge portion includes an abutment surface facing the second passage of the eye portion and that is adapted to abut a pintle hook, and wherein the abutment surface is arcuately-shaped.

7. The drawbar assembly of claim 1, wherein the mounting member includes a flange portion have a plurality of mounting apertures extending therethrough and that are adapted to receive mounting bolts therein to couple the drawbar to a vehicle.

8. The drawbar assembly of claim 1, wherein the wedge portion abuts the mounting member, thereby limiting a distance the wedge member may extend into the second passage.

9. A drawbar assembly, comprising:
a mounting member adapted to couple to a vehicle and including a body portion having a first passage;
an eye portion extending outwardly from the body portion, the eye portion including a second passage extending therethrough adapted to receive a pintle hook therein; and
a wedge member slidably received within the first passage of the body portion and slidably movable between a first position, wherein a majority of the wedge member is withdrawn into the first passage of the body portion, and a second position, wherein the wedge member extends further into the second passage of the eye portion than when the wedge member is in the first position.

10. The drawbar assembly of claim 9, wherein first passage of the body portion has a first cross-sectional shape, and wherein the wedge member has a second cross-sectional shape that is complimentary to the first cross-sectional shape of the first passage of the body portion thereby preventing rotation of the wedge member with respect to the body portion of the mounting member.

11. The drawbar assembly of claim 10, wherein first cross-sectional shape is oval-shaped.

12. The drawbar assembly of claim 9, wherein the wedge member is pneumatically driven between the first and second positions.

13. The drawbar assembly of claim 9, wherein the eye portion is integral with the body portion of the mounting member.

14. The drawbar assembly of claim 9, wherein the wedge portion includes an abutment surface facing the second passage of the eye portion and that is adapted to abut a pintle hook, and wherein the abutment surface is arcuately-shaped.

15. The drawbar assembly of claim 9, wherein the mounting member includes a flange portion having a plurality of mounting apertures extending therethrough and that are adapted to receive mounting bolts therein to couple the drawbar to a vehicle.

16. The drawbar assembly of claim 9, wherein the wedge portion abuts the mounting member, thereby limiting a distance the wedge member may extend into the second passage.

17. A drawbar assembly, comprising:
a mounting member adapted to couple to a vehicle and including a body portion having first passage having a first cross-sectional shape;
an eye portion extending outwardly from the body portion, the eye portion including a second passage extending therethrough adapted to receive a pintle hook therein; and
a wedge member slidably received within the first passage of the body portion and slidably movable between a first position, wherein the wedge member is withdrawn into the first passage of the body portion, and a second position, wherein the wedge member extends further into the second passage of the eye portion than when the wedge member is in the first position, and wherein the wedge member has a second cross-sectional shape that is complimentary to the first cross-sectional shape of the first passage of the body portion, thereby preventing rotation of the wedge member with respect to the body portion of the mounting member.

18. The drawbar assembly of claim 17, wherein first passage of the body portion has a first cross-sectional shape, and wherein the wedge member has a second cross-sectional shape that is complimentary to the first cross-sectional shape of the first passage of the body portion thereby preventing rotation of the wedge member with respect to the body portion of the mounting member.

19. The drawbar assembly of claim 18, wherein first cross-sectional shape is oval-shaped.

20. The drawbar assembly of claim 17, wherein the wedge member is pneumatically driven between the first and second positions.

21. The drawbar assembly of claim 17, wherein the eye portion is integral with the body portion of the mounting member.

22. The drawbar assembly of claim 17, wherein the wedge portion includes an abutment surface facing the second passage of the eye portion and that is adapted to abut a pintle hook, and wherein the abutment surface is arcuately-shaped.

23. The drawbar assembly of claim 17, wherein the mounting member includes a flange portion having a plurality of mounting apertures extending therethrough and that are adapted to receive mounting bolts therein to couple the drawbar to a vehicle.

24. The drawbar assembly of claim 17, wherein the wedge portion abuts the mounting member, thereby limiting a distance the wedge member may extend into the second passage.

* * * * *